TAPE TRANSPORT LOADING APPARATUS

Filed Nov. 6, 1967 3 Sheets-Sheet 1

INVENTORS.
ALAN K. JENNINGS
ROBERT A. KLEIST
RICHARD TOBEY
BY FOWLER, KNOBBE & MARTENS
ATTORNEYS.

INVENTORS.
ALAN K. JENNINGS
ROBERT A. KLEIST
RICHARD TOBEY
BY
FOWLER, KNOBBE & MARTENS
ATTORNEYS.

INVENTORS.
ALAN K. JENNINGS
ROBERT A. KLEIST
RICHARD TOBEY
FOWLER, KNOBBE
& MARTENS.
ATTORNEYS.

3,491,968

TAPE TRANSPORT LOADING APPARATUS

Alan K. Jennings and Robert A. Kleist, Anaheim, and Richard Tobey, Tustin, Calif., assignors to Tally Corporation, a corporation of Washington Filed Nov. 6, 1967, Ser. No. 680,928
Int. Cl. C11b *15/32;* B65h *63/02, 59/38*
U.S. Cl. 242—190 12 Claims

ABSTRACT OF THE DISCLOSURE

A tape transport wherein a motor-driven tape supply reel and a motor-driven tape take-up reel are rotatably mounted on a tapedeck; buffer tape storage means which is responsive to the tape supply between the reels; and, reel servo means which is responsive to the buffer tape storage means and generates a drive signal to the motor-driven tape supply reel to maintain a predetermined tape supply. A tape load signal is generated by a tape load signal generating means and applied to the motor-driven tape take-up reel to cause tape to load onto the take-up reel and then to advance tape from the tape supply reel to the tape take-up reel.

BACKGROUND OF THE INVENTION

Field of the invention

This invention relates to improvements in magnetic tape transports.

Description of the prior art

A magnetic tape transport typically includes a tape supply reel (file reel) and a tape take-up reel. A capstan drive is usually provided for driving the tape in either direction between the reels. The tape path between the reels includes, in addition to the capstan drive, a read and write head and a tape buffer storage means. The tape buffer storage means isolates the tape reels from the rapid acceleration and deceleration of the capstan drive, allowing the reels the time required due to their inertia to respond to changes in velocity and direction of tape. The tape reels may be driven by servo motors responsive to the tape buffer means (which cause the reels) to take up tape supplied from the capstan drive or to supply tape thereto as indicated by the buffer storage means.

Tape is loaded on the above-described apparatus by placing the tape supply reel into position, threading the tape along the tape path and securing it to the tape take-up reel. A load button may then be depressed causing the capstan drive to advance the tape to a predetermined point on the tape.

SUMMARY OF THE INVENTION

The present invention is an improvement upon a tape transport having; an enclosed tapedeck with a capstan drive to advance tape between a motor-driven tape supply reel and a motor-driven tape take-up reel, a buffer tape storage means which is responsive to the tape supply between the tape reels and the capstan drive, and a reel servo means responsive to the buffer tape storage means for generating motor drive signals to the reel motors to maintain a predetermined tape supply, wherein opening the door to the enclosure disables the motor drive signals to the reel motors.

A tape load signal is generated by a tape load control signal generating means which drives the take-up reel motor forward to load tape onto the tape take-up reel from the tape supply reel. The tape load signal generating means also enables the reel servo means associated with the tape supply reel allowing the servo means to drive the tape supply reel motor once a predetermined minimum tape supply has been established between the tape take-up reel and the tape supply reel.

By employing the tape take-up reel motor to advance the tape instead of the capstan, the time required to load the tape from the tape supply onto the tape take-up reel is greatly reduced, hence allowing the beginning of the data portion of the tape to be placed a safe distance from the end of the tape. This feature assures that damage to the end of the tape during the loading and unloading will not destroy important data on the tape.

Another advantage enjoyed by the present invention is that the load controls may be placed inside the enclosed portion of the tapedeck. This obviates the danger of an operator inadvertently depressing a load control button during a normal operating mode.

Another feature of the present invention is the improved tape take-up reel hub. A circle of non-round posts form the hub upon which tape may be wound. Tape from the tape supply reel is threaded through the tape path and placed diagonally across the tape take-up reel hub. When the reel is rotated, the tape secures itself. Each post in the tape take-up reel hub has an outer surface which contacts the tape pack and has the shape of a circle segment having a radius which is less than the hub radius such that the tape being unwound from the hub will leave the post tangent to that circle segment.

This feature allows the tape to be self-securing and, at the same time, eliminates damage to the tape by distributing the total force of the tape pack uniformly over the maximum area possible and eliminating the pressure buildup that is caused by the smaller radius of round posts.

DESCRIPTION OF THE PREFERRED EMBODIMENTS

Figure 2:
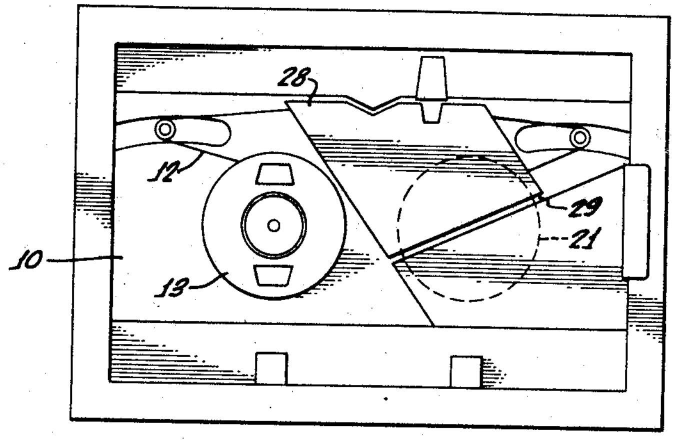
FIG. 2 is a front elevation view of the tape recorder of FIG. 1 with the guide panel in place.
Figure 1:
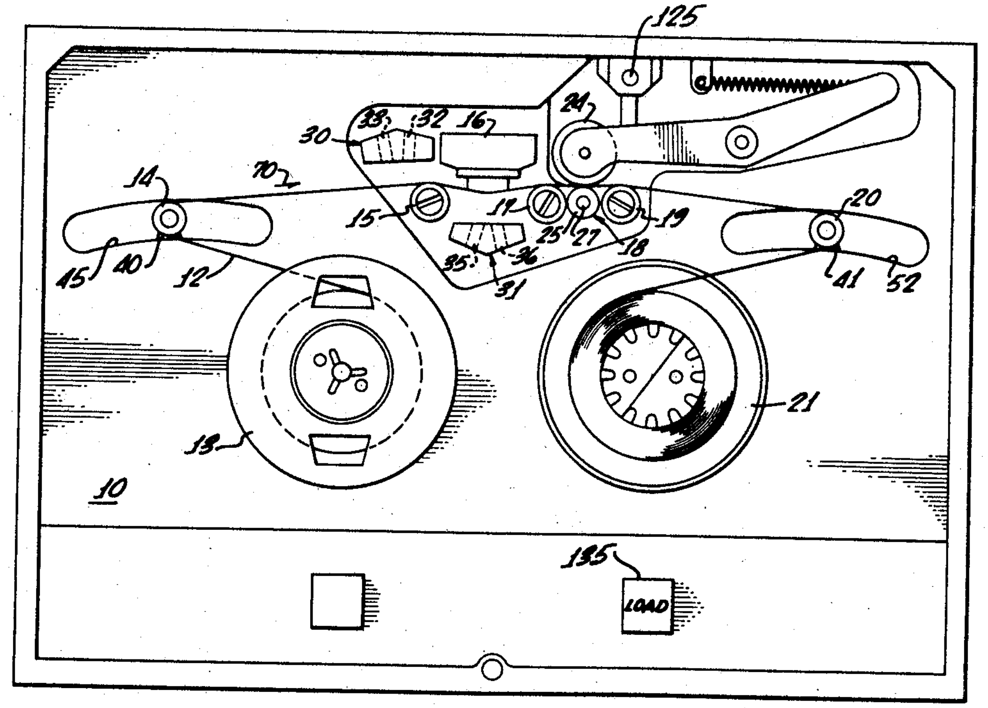
FIG. 1 is a front elevation view of the tapedeck of a digital tape transport constructed in accordance with the preferred embodiment of this invention and showing the guide panel removed.

Referring now to FIG. 1, there is shown the front side of a tapedeck 10 of a tape transport embodying the present invention. The magnetic tape 12 wound on the supply or file reel 13 traverses a path defined by buffer roller 14, guide 15, read-white head 16, guide 17, capstan assembly 18, guide 19, buffer roller 20 and take-up reel 21.

The capstan assembly 18 controls the movement of the tape in both directions past the head 16 during normal operation for enabling data transfer to and from the tape. In this assembly, the pressure roller 24 bears against the capstan 25 at all times except when the tape is being loaded onto the transport. The roller 24 is mechanically retracted from the capstan 25 when tape is to be loaded. Acceleration and deceleration of the tape in either direction is accomplished by bi-directional accelerating or decelerating a motor (not shown) mounted on the rear side of tapedeck 10 having a shaft 27 on which is fixedly mounted the capstan 25.

Both the file reel 13 and the take-up reel 21 are controlled by a servo system to accommodate rapid starts and stops of the tape. Advantageously, the servo system is constructed as disclosed and claimed in the co-pending U.S.A. patent application, Ser. No. 653,820, entitled "Magnetic Tape Transport," filed on July 17, 1967 by Richard Tobey, and assigned to Dartex, Division of Tally Corporation, assignee of the present application. The system includes two buffer tape storage means, each adapted to respond to the tape supply between the file and take-up reels. The tape storage means includes buffer arms 40 and 41 rotatably mounted to the rear side of the tapedeck 10. Each arm includes a roller at its outer end extending parallel to the pivot axis through an arcuate slot formed in the tapedeck 10, e.g. roller 14 integral with arm 40 and extending through arcuate slot 45. Slot 45 defines the limits of travel of the buffer arm 40. In like manner, slot 52 defines the outer and inner limits of travel of buffer arm 41.

Figure 3:
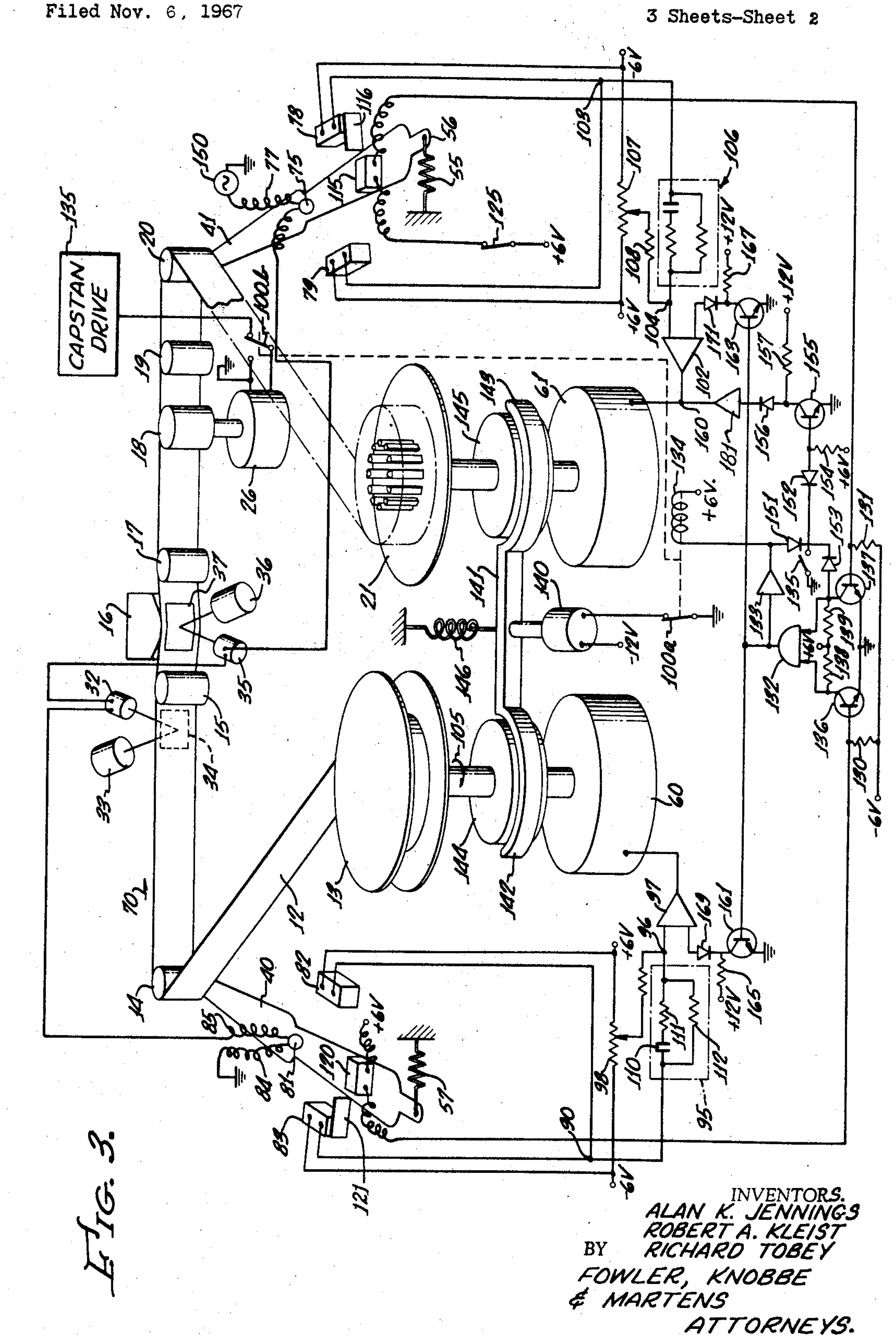
FIG. 3 is an electrical schematic and diagrammatic perspective view illustrating the reel servos and load signal generating means.

Tape tension is determined by the force exerted by a tension spring biasing the buffer arm towards its outer limit position. As shown in FIG. 3, tension spring 55 has one end affixed to the tapedeck 10 and the other end connected to a tong 56 extending away from the pivot axis of the buffer arm 41 in a direction opposite to the roller 20. In like manner, tension is applied to arm 40 by tension spring 57.

Two reel servo means, each adapted to respond to one of the buffer tape storage means, apply suitable drive signals to the file reel 13 by way of its drive motor 60 and take-up hub 21 by way of its drive motor 61, to counterbalance tension of the responsive tension springs and maintain each of the buffer arms between the extreme outer and inner travel limits in a predetermined null position as shown in FIGS. 1 and 3.

The servo system effectively isolates the file and take-up reels from the captan drive so that rapid starts and stops of the tape are accommodated by rotation of the buffer arms 40 and 41 on their respective pivot axes. For example, if the capstan accelerates the tape in the direction of arrow 70 (FIG. 1), buffer arm 40 will momentarily rotate toward its inner limit and buffer arm 41 will momentarily rotate toward its outer limit. These respective movements of the buffer arms are detected, causing a reduced drive signal to be applied to file reel motor 60 and an increased drive signal to take-up hub motor 61 to return the buffer arms to their respective null positions.

The position of buffer arm 41 is detected by means of a light energy source 75 such as a miniature incandescent bulb carried by the buffer arm and light sensitive means comprising photosensitive devices 78 and 79 fixedly mounted to the recorder housing for providing an electrical characteristic corresponding to the position of the lamp.

In like manner, the position of the buffer arm 40 is monitored by the lamp 81 carried by the buffer arm and a pair of photosensitive devices 82 and 83 located on opposite sides of the arm. Lamp 81 is energized by flexible leads 84 and 85.

A block diagram of the reel servo system is shown in FIG. 3. The position of the buffer arms 40 and 41 and relay contact states shown in this figure are those which exist during normal operation of the recorder in a record/playback or rewind operation. In the embodiment of FIG. 3, the photosensitive devices responsive to lamp 81 are photoresistors. The photoresistors 82 and 83 are advantageously differentially coupled so as to provide an output signal corresponding to the difference between the output electrical characteristics of these devices and independent of any ambient light falling evenly on the sensors 82 and 83 or variation in the output of the lamp 81. Thus, as shown, the photoresistors 82 and 83 are connected together in series circuit between opposite polarity sources, typically +6 volts and −6 volts, to provide an output node point 90 at the common connection of the photoresistors. A continuous voltage is produced at node 90 corresponding to the angular position of the light source 81. The magnitude of this voltage corresponds to the angular displacement of the lamp 81 and the polarity of the voltage corresponds to the direction of the displacement thereof.

In the servo means shown, the output voltage at node 90 is connected through a phase-lead network 95 to the summing junction 96 of the servo amplifier 97. A preselected non-varying current is also supplied to the summing junction 96 by a buffer arm adjust potentiometer 98 and series resistor 99. The fixed contacts at respectively opposite ends of the potentiometer resistance winding are connected between the +6 and −6 volts sources, and its movable contact is connected by way of resistor 99 to summing junction 96.

The servo loop is completed by a connection between the output of servo amplifier 97 and file reel motor 60.

The operation of the file reel servo is as follows: The movable contact of the buffer arm adjust potentiometer 98 is adjusted to position the buffer arm 40 at the predetermined null position. In this position, a suitable error signal is produced at the summing junction 96 by virtue of the difference between the voltage at node 90 and movable contact of potentiometer 98 to produce a motor torque in the direction of arrow 105 sufficient to counterbalance the force of spring 57. Acceleration of the tape in the direction of arrow 70 by the capstan drive and consequent movement of the buffer arm toward its inner limit will cause a reduced signal at summing junction 96 and, hence, a reduced motor torque so that the arm will return to the null position set by potentiometer 98. Deceleration of the tape in the direction of arrow 70 (or acceleration in the opposite direction such as in rewind) will produce movement of the buffer arm 40 toward its outer limit. As a result, an increased signal will be applied to summing junction 96 to supply an increased motor torque in the direction of arrow 105 to return the arm 40 to its predetermined null position.

In like manner, the take-up reel servo means includes a common node connection 103 between the position sensor photoresistors 78 and 79 connected to the summing junction 104 of servo amplifier 102 through phase-lead network 106. The output of this amplifier is connected to the servo drive motor 61 coupled to the take-up hub. The movable arm of buffer arm adjust potentiometer 107 is connected through resistor 108 to the summing junction 104. The operation of the take-up servo loop is the same as the above-described file reel servo.

The tape transport described herein includes means for detecting movement of the buffer arm through a predetermined position. For example, when the file reel buffer arm 40 swings to its extreme outer position, its buffer storage capacity is filled so that it cannot accept any additional tape fed from the file reel. If more tape is then fed from the file reel, the tape will go slack and possibly become entangled in the transport apparatus. Such occurrence is obviated by providing each of the buffer arms with a sensor means for detecting movement of the buffer arm to a predetermined limit position, typically to within 1° or less of its extreme outer limit position. As shown in FIG. 3, light responsive device 115 is carried on the arm 41 to continously receive light energy from the lamp 75 except when the arm swings to the outer limit position, at which occurrence a light shield 116 affixed to the tapedeck blocks off the light rays from the lamp 75 to the sensor 115. Likewise, the buffer arm 40 associated with the file reel servo carries the light responsive element 120 which cooperates with the shield 121 attached to the tapedeck for detecting movement of the buffer arm 40 to its outer position.

The outputs of the limit sensors 115 and 120 are AND-ed by coincidence gate 132 and its associated circuitry shown in FIG. 3. So long as the output of gate 132 is true, the servo amplifiers 97 and 102 are enabled and the relay 134 is actuated. The output of gate 132 is connected to the base of two grounded emitter transistors 161 and 163 associated with servo amplifiers 97 and 102 respectively. When the output of gate 132 is true, transistors 161 and 163 will conduct placing a ground on their respective amplifiers 97 and 102 through diodes 169 and 171, respectively. The transistors are cut off when the output of gate 132 is false, allowing the +12 v. potential connected to the transistor collectors through resistors 165 and 167 to back bias the diodes 169 and 171 and disable the amplifiers by removing their ground connections.

Relay 134 is advantageously used to provide a plurality of control functions. Contact 100*a* is connected in series with the brake solenoid 140 and is normally open. Single-pull, double-throw contacts 100*b* include a normally closed set connected in a shunt with the capstan drive motor 26 and a normally open set connecting the capstan motor to the capstan drive signal source 135.

The brake solenoid 140 is mechanically coupled to a brake arm 141 provided with a pair of brake shoes 142 and 143 which respectively cooperate with a brake hub 144 on the file motor axis and brake hub 145 on take-up reel motor. Brake arm 141 is normally engaged with the brake hub by tension spring 146. However, upon energization of the brake solenoid 140 by closure of the contacts 100*a* of the control relay, the brake arm is displaced from the brake hub as illustrated in FIG. 3.

The short placed across the leads of the capstan motor 26 by the normally closed set of relay contact 100*b* when relay 134 is de-energized, provides for dynamic braking of the capstan drive if the capstan is rotating when the control relay is de-energized.

Relay 134 is actuated by two possible means. The first is a disabling means including gate 132 and the second is load switch 135.

During normal operation, the outputs of limit sensors 115 and 120 are AND-ed by gate 132, causing relay 134 to be actuated. One lead of each of the limit sensors 115 and 120 is connected to a potential source, e.g. the +6 volts as shown in FIG. 3. Sensor 115 is connected in series with the door interlock switch 125. The other leads of the limit sensors are connected to respective bases of transistor switches 136 and 137. The bases of these transistors are also connected to a potential source through respective resistors 130 and 131, which is opposite in polarity to the potential source connected to the opposite side of the limit sensors. The transistors have grounded emitters and have their collectors connected to the input of gate 132. The collectors are also connected to a +6 volts potential through respective resistors 138 and 139.

So long as both of the photoresistors 115 and 120 receive light inputs from their associated lamp, that is so long as the buffer arms 40 and 41 are not at their extreme outer limits, a positive potential will exist at the base of the respective transistor due to the low impedance through these photoresistors. When a positive potential exists at the base of either transistors 136 and 137, that transistor will conduct, causing its collector to assume a ground potential. When both of the inputs to gate 132 are at ground, the output from gate 132 will cause the relay 134 to actuate and will enable the servo amplifiers 97 and 102.

If, however, one of the lamps 75 or 81 should be extinguished or should either of the limit shields be imposed between its associated lamp and limit sensor by virtue of movement of the buffer arm to the extreme outer position, or should the door to the enclosed tapedeck be opened opening interlock switch 125, one of the transistors 136 or 137 will have a negative potential applied to its base through respective resistors 130 and 131, preventing that transistor from conducting. The collector potential of the non-conductive transistor will assume a positive potential due to the +6 volts through resistors 138 and 139. The output of gate 132 will not be true when one of its inputs is positive, and therefore the relay 134 will be de-actuated and the servo amplifiers 97 and 102 will be disabled as previously discussed.

It will therefore be seen that the machine operation is automatically halted when either of the buffer arms swings to the outer limit position, or when the tape transport door is opened causing interlock switch 125 to open.

To load tape onto the tape transport, the tape transport door is opened, opening the door interlock switch 125 causing the disabling means to de-actuate the relay 134 and the reel servo means; and, the buffer arms 40 and 41 are biased to their outer limits by springs 57 and 55, respectively.

The new tape supply reel 13 is inserted into its position and the tape 12 is threaded along its tape path, as shown in FIG. 1. The end of the tape is placed in position for loading by the tape take-up reel 21 by laying the tape diagonally across the hub of the tape take-up reel 21 between the posts, as shown in FIG. 1.

A tape load signal generating means comprising a load switch 135, seen in FIGS. 1 and 3, and a switching means which includes transistor 155 will generate a load signal for driving the tape take-up reel motor 61 forward to load tape from the tape supply reel onto the tape take-up reel.

One side of the load switch 135 is connected to ground the other side is connected inter alia to the coil of relay 134 through diode 151. When the switch 135 is closed, the positive potential on the other side of the relay 134 coil is connected to ground causing the relay to actuate releasing the reel brake.

The switching means is responsive to the load switch 135. The base of the grounded emitter NPN transistor 155 is connected to the load switch 135 through diode 152. The transistor 155 is normally conducting due to the positive potential applied to the base through resistor 154. When the switch 135 is closed, the diode 152 is forward biased clamping the base of transistor 155 to ground cutting off the transistor. The collector of transistor 155 is connected to the input of an amplifier 181 through a diode 156. The output of amplifier 181 is an input to the take-up reel motor 61. The collector of transistor 155 is near ground potential when the transistor is conducting and is at a positive potential when not conducting due to the +12 v. connected to the collector through resistor 157. When the transistor 155 is conducting the voltage at node point 160 is controlled by the output of amplifier 102. However, when the transistor 155 is cut off, the output of amplifier 181, with the +12 v. through resistor 157 and diode 156 as an input, overrides any output from the amplifier 102 and controls the tape take-up reel motor 61.

The load switch 135 is also connected to the disabling means, which includes gate 132, for selectively enabling the reel servo amplifiers 97 and 102. When the load switch 135 is closed, the collector potential of transistor 137 is reduced to ground through diode 153. This enables one input to gate 132. The other input to gate 132 remains positive until the buffer arm 40 is drawn inward by the tape as the tape take-up reel 21 shortens the tape length between reels. Once a minimum tape supply threshold has been exceeded, the buffer arm 40 will be displaced from its outer limit, the potential on the base of the transistor 132 will then become positive due to the conductance of photoresistor 120, causing the transistor to conduct reducing the collector potential to ground enabling the second input to the coincidence gate 132. The output of gate 132 enables reel servo amplifiers 97 and 102 when both inputs are enabled.

The tape will continue to load onto the tape take-up reel 21 from the tape supply reel 13 with the buffer tape storage means associated with the tape supply reel 13 being operative until the load switch 135 is released.

When the operator releases the load switch 135, having determined that a predetermined load point on the tape has been wound onto the take-up reel, the transistor 155 again becomes conducting removing the +12 v. input to amplifier 103, the relay 134 is de-actuated, causing the reel brakes to be applied and the output of gate 132 goes false disabling reel servo amplifiers 97 and 102. The transport door must then be closed, closing the door interlock switch 125, before normal operations can be initiated.

Normal operation by the tape transport, shown in FIG. 1, is initiated, after the door has been closed, by the depression of a rewind button, not shown, which is located outside the tapedeck enclosure. Capstan Drive Circuitry 135 senses the depression and generates a fast reverse drive signal to capstan motor 26 driving tape 12 in a direction opposite arrow 70 (FIG. 3). Sensing means 31 comprising a light source 35 and a transducer 36 is included in the tape path opposite the read and write head 16. Sensing means 31 will generate an output to Capstan Drive Circuitry 135 when the predetermined load point, indicated by a reflective tab 37, passes on the tape 12. The circuitry 135 will thereupon reverse the drive signal applied to the capstan motor 26 and drive it slowly forward until the tab 37 again appears proximate the sensing means 31. The tape 12 is then in a position for normal read/write operations.

Figure 5:
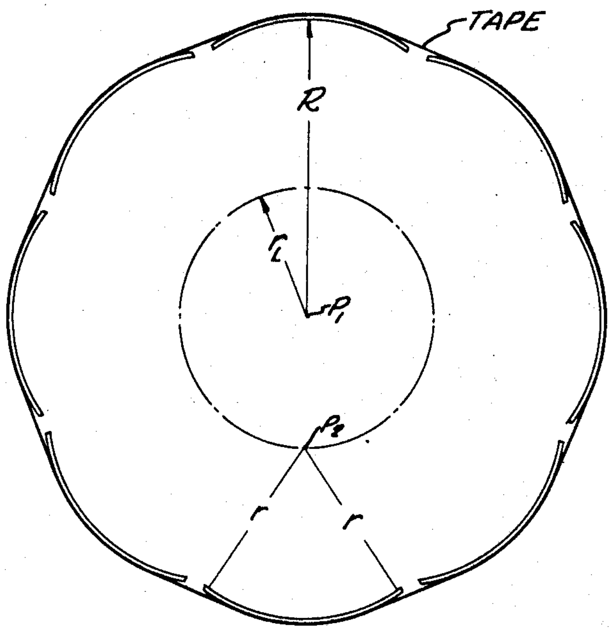
FIG. 5 is a diagram showing the tape hub of the present invention.

The hub of the take-up reel 21 allows facile threading of the tape and provides a simple means for causing the tape to self-secure to the reel when the reel is rotated. Referring now to FIG. 5, it can be seen that posts forming the substantially circular hub of the reel 21 are non-round and have an outer surface contacting the tape pack formed substantially in the shape of a segment of a circle having a radius $r$, which approximates the radius of the hub, R so that as tape is being wound onto the hub, it makes contact with the post tangent to the circle segment but is sufficiently less than the radius thereof to provide a gap between the tape and the end of the segment. If, for example, the circle radius was equal to the radius of the hub, that is if slots were merely made in an ordinary hub, as shown in FIG. 4A, tape being wound onto the hub would initially make contact with the sharp edge of each segment of the hub, resulting in a high pressure point. It can also be seen in FIG. 4A that the tape pack after being wound on the hub will have high pressure points at the extremities of each hub segment. The tape on the hub is supported by each hub segment but has no support between segments. The tape will not follow a curved path between segments due to the lack of support and will instead follow a straight line.

High pressure points therefore will occur at both ends of each hub segment where the tape transitions between a curved and a straight path. The situation may be further aggravated if any irregularity, such as a burr, is present on the segment end.

Figure 4B:
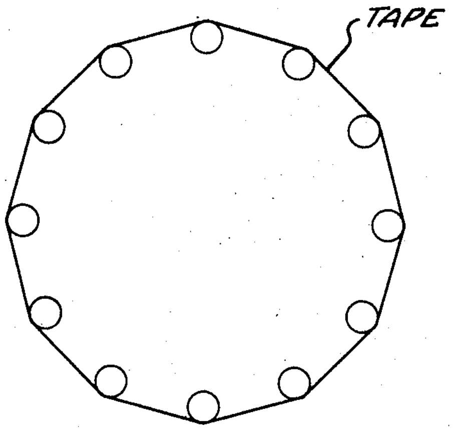
FIGS. 4A and 4B are diagrams showing two prior art tape hubs.
Figure 4A:
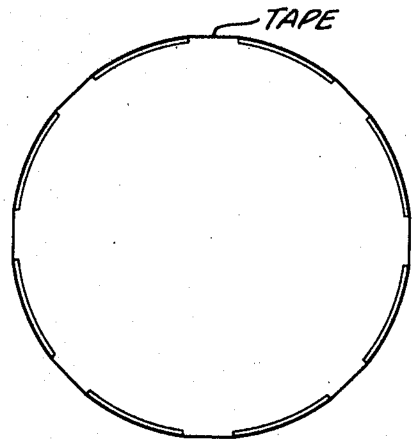

In FIG. 4B there is shown a tape hub of the prior art formed by round posts. The use of circular posts greatly diminishes the contact area between the tape pack and the hub. The pressure that the tape pack exerts upon the tape hub is accordingly concentrated at the points of contact between the posts and the tape pack. Although the use of round posts permits facile tape threading, it is also accompanied by tape damage due to the high pressure points at the posts.

The tape hub of the present invention, FIG. 5, eliminates the high pressure points of the circular post hub of FIG. 4B by maximizing the support area for the tape pack. It can be seen that the support area of the present invention approximates the area of the circular hub shown in FIG. 4A. However, since the radius $r$ of the circle segments comprising the hub is less than the radius R of the hub much of the deleterious effect of the segments discussed in connection with FIG. 4A is obviated. That is, since the segment ends have a slight curvature inward, leaving the circular path of the tape pack at a small angle the transition by the tape between a curved and a straight path occurs over a wider support area decreasing the per unit area pressure of the hub segment upon the tape pack.

In FIG. 5, point $P_2$ is the center of curvature for one of the hub segments and is in the circumference of a circle which is the locus of center points for all the hub segments. The locus has a radius of $r_L$ which is equal to the radius of the hub, R, minus the radius of curvature of the hub segments, $r$. As $r_L$ approaches zero the radius $r$ approximates R and the total contact surface between the hub segments and the tape pack is increased. The total contact surface is also maximized when the number of hub segments and the space between them is minimized.

We claim:

1. A magnetic tape recorder comprising:
motor driven first and second tape reels;
buffer tape storage means for responding to the tape supply between said tape reels;
reel servo means responsive to said buffer tape storage means for generating a drive signal to said first tape reel motor to maintain a predetermined tape supply between said reels; and
a tape load signal generating means for generating a load signal for driving said second tape reel motor to load tape from said first tape reel to said second tape reel, independent of the tape supply between the reels.

2. The apparatus of claim 1, wherein said tape load signal generating means comprises:
a load switch; and
switching means responsive to said load switch for generating said load signal when said switch is actuated.

3. A magnetic tape recorder having:
motor driven first and second tape reels;
buffer tape storage means for responding to the tape supply between said tape reels;
reel servo means responsive to said buffer tape storage means for generating a drive signal to said first tape reel motor to maintain a predetermined tape supply between said reels; and
a tape load signal generating means for generating a load signal for driving said second tape reel motor to load tape from said first tape reel to said second tape reel, comprising:
 a load switch; and
 switching means responsive to said load switch for generating said load signal when said switch is actuated, comprising:
  a grounded emitter NPN transistor switch which is conducting when said load switch is not actuated and not conducting when said load switch is actuated having its base connected to said load switch and its collector connected to said second tape reel motor.

4. A magnetic tape recorder comprising:
motor driven first and second tape reels wherein said first tape reel is a tape supply reel and said second tape reel is a tape take-up reel;
buffer tape storage means for responding to the tape supply between said tape reels;
reel servo means responsive to said buffer tape storage means for generating a drive signal to said first tape reel motor to maintain a predetermined tape supply between said reels;
a tape load signal generating means for generating a load signal for driving said second tape reel motor to load tape from said first tape reel to said second tape reel;
a door for enclosing said tape supply and tape take-up reels;
second buffer tape storage means adapted to respond to the tape supply between said tape supply reel and said tape take-up reel;
second reel servo means responsive to said second buffer tape storage means for generating a drive signal to said take take-up reel to maintain a predetermined tape supply between said tape supply reel and said tape take-up reel;
a door interlock electrical switch de-actuated when said door is opened; and
disabling means for disabling said reel servo means when said door interlock switch is de-actuated.

5. The apparatus of claim 4, wherein said tape load signal generating means comprises:

a load switch operatively coupled to said disabling means for selectively enabling said reel servo means; and switching means responsive to said load switch for generating said load signal when said switch is actuated for driving said tape take-up reel motor to load tape from said tape supply reel to said tape take-up reel.

6. The apparatus of claim 4, wherein said tape load signal generating means selectively enables said reel servo means, said reel servo means being responsive to said buffer tape storage means only after a predetermined tape supply threshold has been exceeded between said tape supply reel and said tape take-up reel as the tape is being loaded onto said tape take-up reel from said tape supply reel.

7. The apparatus of claim 4, wherein said disabling means comprises:

a coincidence gate having a first and a second input and an output connected to both said reel servo means enabling said reel servo means to generate drive signals in response to said buffer tape storage means when said first and said second inputs are coincident;

a first current source connected in series with said door interlock switch for enabling said first input when said door interlock switch is actuated; and a second current source responsive to said first buffer tape storage means for enabling said second input when the tape supply between said tape supply reel and said tape take-up reel exceeds a minimum threshold.

8. The apparatus of claim 7, wherein said tape load signal generating means includes:

a load switch connected to said first coincident gate input for enabling said input when said door interlock switch is de-actuated.

9. A magnetic tape recorder comprising:

(a) motor driven file and take-up reels;

(b) reel servo means for driving said file reel motor;

(c) means for disabling said reel servo means while loading tape on said recorder; and (d) load control means for selectively applying a predetermined drive signal to said take-up reel for winding tape thereon during loading of said recorder, independent of the tape supply between the reels.

10. The tape recorder defined in claim 9 wherein said reel servo means for driving said file reel is enabled when the tape supply between said take-up reel and said file reel exceeds a predetermined threshold.

11. A magnetic tape recorder comprising:

motor driven file and take-up reels;

a door for enclosing said file and take-up reels;

buffer tape storage means;

reel servo means responsively coupled to said buffer tape storage means for driving said file reel motor;

means for disabling said reel servo means when said loading door is opened;

a load switch; and load control means responsive to actuation of said load switch for applying a predetermined drive signal to said take-up reel for winding tape thereon during loading of said recorder.

12. A magnetic tape recorder comprising:

motor driven file and take-up reels;

a door for enclosing said file and take-up reels;

buffer tape storage means for storing tape being supplied from said file reel;

reel servo means responsively coupled to said buffer tape storage means for driving said file reel to maintain a predetermined tape supply thereon;

means responsive to (i) said buffer tape storage means and (ii) said door for disabling said reel servo means when (i) either said tape storage means is substantially filled or (ii) said loading door is open;

load control means actuable only when said door is open for (i) selectively applying a predetermined drive signal to said take-up reel for winding tape thereon and (ii) enabling said servo means.

References Cited

UNITED STATES PATENTS

| | | | |
|---|---|---|---|
| 2,746,692 | 5/1956 | Wijchman | 242—71.8 |
| 3,244,954 | 4/1966 | Branco | 318—7 |
| 3,265,318 | 8/1966 | Ellmore | 242—74 |

LEONARD D. CHRISTIAN, Primary Examiner

U.S. Cl. X.R.

318—7